(12) United States Patent
Ikeda et al.

(10) Patent No.: US 7,476,643 B2
(45) Date of Patent: Jan. 13, 2009

(54) THERMAL RECORDING MATERIAL AND THERMAL RECORDING LABEL

(75) Inventors: Toshiaki Ikeda, Shizuoka-ken (JP); Takeshi Kajikawa, Shizuoka-ken (JP)

(73) Assignee: Ricoh Company, Ltd., Tokyo (JP)

( * ) Notice: Subject to any disclaimer, the term of this patent is extended or adjusted under 35 U.S.C. 154(b) by 388 days.

(21) Appl. No.: 11/222,636

(22) Filed: Sep. 9, 2005

(65) Prior Publication Data

US 2006/0063013 A1 Mar. 23, 2006

(30) Foreign Application Priority Data

Sep. 21, 2004 (JP) .............................. 2004-272964

(51) Int. Cl.
*B41M 5/132* (2006.01)
*B41M 5/42* (2006.01)

(52) U.S. Cl. ...................................... 503/226; 503/200

(58) Field of Classification Search ........................ None
See application file for complete search history.

(56) References Cited

U.S. PATENT DOCUMENTS

| 5,919,729 | A | 7/1999 | Mori et al. |
| 5,972,836 | A | 10/1999 | Morita et al. |
| 6,432,875 | B1 | 8/2002 | Akutsu et al. |
| 6,593,272 | B2 | 7/2003 | Kakuda et al. |
| 6,660,688 | B2 | 12/2003 | Yamada et al. |
| 6,846,619 | B2 | 1/2005 | Kaneko et al. |
| 2004/0171487 | A1 | 9/2004 | Kajikawa et al. |

FOREIGN PATENT DOCUMENTS

| JP | 62156990 | 7/1987 |
| JP | 01044775 | 2/1989 |
| JP | 1-17478 | 3/1989 |
| JP | 1-198386 | 8/1989 |
| JP | 01198386 | 8/1989 |
| JP | 2-187388 | 7/1990 |
| JP | 3-2088 | 1/1991 |
| JP | 03049986 | 3/1991 |
| JP | 4-22153 | 4/1992 |
| JP | 4-30918 | 5/1992 |
| JP | 4-71716 | 11/1992 |
| JP | 4-77672 | 12/1992 |
| JP | 5-96854 | 4/1993 |
| JP | 5-62079 | 9/1993 |
| JP | 8-151412 | 6/1996 |
| JP | 8-333329 | 12/1996 |
| JP | 10-29969 | 2/1998 |
| JP | 10-87936 | 4/1998 |
| JP | 10-297089 | 11/1998 |
| JP | 10-297090 | 11/1998 |
| JP | 11-314457 | 11/1999 |
| JP | 2000-143611 | 5/2000 |
| JP | 2001-310561 | 11/2001 |
| JP | 2002240427 | 8/2002 |
| WO | WO 99/51444 | 10/1999 |

OTHER PUBLICATIONS

Dec. 7, 2005 official Communication and European Search Report in connection with European Appl. No. EP 05 02 0468.

*Primary Examiner*—Bruce H Hess
(74) *Attorney, Agent, or Firm*—Cooper & Dunham LLP

(57) ABSTRACT

A thermal recording material is provided including a substrate, a thermal coloring layer located overlying the substrate, and a protective layer located overlying the thermal coloring layer. The protective layer includes a binder resin, a crosslinker, a filler; and a release agent. The release agent is a spherical and particulate silicone compound having the following formula: $(CH_3SiO_{3/2})_n$, wherein n represents an integer greater than 15.

18 Claims, No Drawings

THERMAL RECORDING MATERIAL AND THERMAL RECORDING LABEL

TECHNICAL FIELD

The present disclosure relates to a thermal recording material for use in computer outputs, printers used in electronic calculators, recorders used in medical care, low-speed and high-speed facsimiles, automatic ticket machines, handy terminals, etc.

DISCUSSION OF RELATED ART

Conventionally, various recording materials including a substrate (such as a paper, a synthetic paper and a plastic film) and a thermal recording layer (including an achromatic or a hypochromic leuco dye and a developer coloring the leuco dye when contacting thereto), located overlying the substrate, have been proposed. Since the thermal recording materials do not need complicated procedures (such as development and fixing), a comparatively simple device can record information thereon in a short time, and the recording device makes relatively little noise and is inexpensive. Such thermal recording materials are widely used in copies of libraries and documents, electronic computers, facsimiles, ticketing machines, label printers, recorders, handy terminals, etc.

The applications of the thermal recording materials are expanding and more frequently used outdoors, and the thermal recording materials printable in a severe environment of low-temperature and low-humidity are demanded.

Particularly, the thermal recording materials are liable to stick and poorly transport in small label printers and handy terminal printers having a weak motor torque in an environment of low-temperature and low-humidity. For example, Japanese Patent Publications Nos. 1-17478, 4-30918, 4-71716 and 4-77672 have disclosed a protective layer including a water-soluble resin, a pigment and a crosslinker as main components to improve water resistance and chemical resistance of the recorded image and to prevent adherence of extraneous matter to a thermal head of the printer, abrasion thereof and sticking of thermal recording material thereto. Japanese Patent Publication No. 4-22153 discloses use of a polyurethane resin emulsion.

Japanese Laid-Open Patent Publications Nos. 1-198386, 2-187388 and 3-002088 disclose a method of including a silicone compound in the protective layer to improve the transportability and sticking of the thermal recording material. However, the thermal recording material still sticks to thermal heads of small label printers and handy terminal printers having a weak motor torque in an environment of low-temperature and low-humidity because melted materials from the thermal layer and protective layer thereof. In addition, recorded image density and stability deteriorate, and extraneous matter adhered to the thermal head increases.

Japanese Laid-Open Patent Publication No. 5-096854 discloses a method of including a particulate dimethyl silicone resin in the protective layer. However, the dimethyl silicone resin has an effect on the sticking, but does not work on the abrasion resistance of the thermal head.

Japanese Patent Publication No. 5-62079 discloses a method of including a particulate silicone compound having the following formula in the protective layer:

$(CH_3SiO_{1.5})_n$ wherein n is an integer of from 5 to 15.

However, the transportability at high-humidity and sticking resistance at low-temperature of the resultant thermal recording material are not satisfactory.

Recent developers having a high melting point, such as a (poly)4-hydroxy benzoic acid derivative and a diphenyl sulfonic acid derivative disclosed in Japanese Laid-Open Patent Publication No. 10-29969, quickly become solidified after melting under conditions of low-temperature and low-humidity. Therefore, melted materials are liable to adhere to the thermal head and the sticking problem tends to occur.

Accordingly, demands for thermal recording materials having sticking resistance without deterioration of recorded image density and stability are increasing.

In addition, a thermal recording material is required to quickly develop images having high density, and to have tough developed images and background. Further, recently, a large amount thereof are used in a field wherein recorded images need to have high reliability, and are required to have high stability against plasticizers and oils and fats included in a organic polymer material used for packaging.

In order to improve a thermal recording material for use on packaging and the like, a protective layer is formed on a thermal recording layer of the thermal recording material. Particularly, it is suggested that polyvinylalcohol (PVA) or modified PVA, or a combination thereof with a water resistant agent is used in the protective layer.

As a method of making the thermal recording material water-resistant, Japanese Laid-Open Patent Publication No. 8-151412 discloses a method of using PVA having a diacetone group and a hydrazine compound in a protective layer. However, a coating liquid including such a PVA or modified PVA has difficulty becoming water resistant and has an increased viscosity. Japanese Laid-Open Patent Publication No. 11-314457 discloses a method of including modified PVA having a diacetone group in a protective layer and a hydrazine compound in a thermal developing layer. However, the protective layer does not have sufficient water resistance, a coating liquid for the thermal developing layer increases its viscosity, and the hydrazine compound impairs development therein. Japanese Laid-Open Patent Publication No. 10-87936 discloses a method of including a copolymer including diacetone acrylamide as a monomer, a hydrazide compound and a water-soluble amine in a protective layer. However, the amine affects a thermal developing layer and causes background development, pH control with the amine of a coating liquid therefor is difficult, and the coating liquid occasionally increases its viscosity depending on an amount of the amine.

In addition, a polymer material is used as a developer having high image stability against plasticizers and oils and fats. Japanese Laid-Open Patent Publication No. 08-333329 discloses a polymer developer of a diphenyl sulfonic acid derivative.

International Patent No. WO99/51444 discloses a (poly)4-hydroxybenzoic acid derivative. Japanese Laid-Open Patent Publication No. 2000-143611 discloses a polymer urea urethane compound. These developers have high image stability against plasticizers and oils and fats, but has low developing sensitivity and developing density. Japanese Laid-Open Patent Publications Nos. 10-297089 and 10-297090 disclose a method of using a developer having a low melting point and a sensitizer to catch up with the developing sensitivity and the developing density of the polymer developer of a diphenyl sulfonic acid derivative. However, although the developer having a low melting point and the sensitizer improve the apparent developing sensitivity and the apparent developing density, deterioration of the image density due to plasticizers is noticeable. This is because the developer having a low melting point loses its advantage of chemical resistance due to the sensitizer. Namely, the polymer developer is required to have both higher developability and high chemical resistance.

The developer and sensitizer having a low melting point melt together with the leuco dye and the developer to decrease the melting point. When the melting point decreases, the sensitivity improves. However, the developing temperature decreases, resulting in occurrence of background development at a low temperature.

Japanese Laid-Open Patent Publication No. 2001-310561 discloses combinations of 4-hydroxy-4'-allyloxydiphenylsulfone and various polymer developers to balance the heat resistance, sensitivity and chemical resistance of a thermal recording material. However, an image survival rate is not 100% yet against chemicals, particularly plasticizers, and this needs further improvement.

Other methods of improving the sensitivity include forming an adiathermic undercoat layer including hollow particles to effectively use heat energy from the thermal heat, emulsifying a dispersion including the leuco dye so as to have a diameter of sub-micron, etc. However, the sensitivity is still insufficient and the background development occurs.

Because of these reasons, a need exists for a thermal recording material having good high-humidity transportability, low-temperature sticking resistance, adaptability to a low-torque printer, chemical (plasticizer) resistance, high-sensitivity without background development, thermostable preservability of the recorded images, and less abrasion of a thermal head.

SUMMARY

Accordingly, an object of the present disclosure is to provide a thermal recording material having good high-humidity transportability, low-temperature sticking resistance, adaptability to a low-torque printer, chemical (plasticizer) resistance, high-sensitivity without background development, thermostable preservability of the recorded images, and less abrasion of a thermal head.

An example of a thermal recording material which can achieve such objects, comprises: a substrate; a thermal coloring layer located overlying the substrate; and a protective layer located overlying the thermal coloring layer. The protective layer: a binder resin; a crosslinker; a filler; and a release agent. The release agent is a spherical and particulate silicone compound having the following formula: $(CH_3SiO_{3/2})_n$, wherein n represents an integer greater than 15.

In addition, the spherical and particulate silicone compound preferably has an average particle diameter of from 1 to 4 µm.

These and other objects, features and advantages of the present disclosure will become apparent upon consideration of the following description of the preferred embodiments of the present disclosure.

DESCRIPTION OF THE PREFERRED EMBODIMENTS

Generally, the present disclosure provides a thermal recording material having good high-humidity transportability, low-temperature sticking resistance, adaptability to a low-torque printer, chemical (plasticizer) resistance, high-sensitivity without background development, thermostable preservability of the recorded images, and less abrasion of a the thermal head.

The thermal recording material of the present disclosure, comprises a substrate, a thermal coloring layer located overlying the substrate, and a protective layer overlying the thermal coloring layer. The protective layer includes a binder resin, a crosslinker, a filler, and a release agent. The release agent is a spherical and particulate silicone compound having the following formula: $(CH_3SiO_{3/2})_n$, wherein n represents an integer greater than 15.

Such a thermal recording material neither sticks to a thermal head in an environment of high-humidity nor sticks to a thermal head of a low-torque printer in an environment of low-temperature and low-humidity. This is because the silicone compound of the present disclosure is not dissolved in an organic solvent to be emulsified, but is dispersed in the protective layer as a particulate solid. The spherical and particulate silicone compound can have a shape ranging from a true sphere to a spheroid, and is insoluble in an organic solvent, having no melting point.

The spherical and particulate silicone compound of the present disclosure has the following formula: $(CH_3SiO_{3/2})_n$, wherein n represents an integer greater than 15, and is different from $(CH_3SiO_{1.5})_n$ disclosed in Japanese Patent Publication No. 5-62079, wherein n is an integer of from 5 to 15. The spherical and particulate silicone compound of the present disclosure, having a larger molecular weight and a particle diameter, has been demonstrated to improve the transportability and low-temperature sticking resistance of the resultant thermal recording material.

The spherical and particulate silicone compound of the present disclosure preferably has an average particle diameter of from 1 to 4 µm. When less than 1 µm, the resultant thermal recording material sticks to a thermal head in an environment of high-humidity. When greater than 4 µm, the thermal head is abraded more. KMP-590 from Shin-Etsu Chemical co., Ltd., X-52-1621 therefrom, etc. can be used as the spherical and particulate silicone compound, and the thermal recording material of the present disclosure neither sticks to a thermal head in an environment of high-humidity nor sticks to a thermal head of a low-torque printer in an environment of low-temperature and low-humidity.

When the spherical and particulate silicone compound is added to a protective layer coating liquid, it is preferable that the spherical and particulate silicone compound is uniformly dispersed in an aqueous solution of a surfactant first and then the dispersion is added thereto. In this way, the spherical and particulate silicone compound is uniformly dispersed therein, and the resultant thermal recording material sticks less to a thermal head in an environment of high-humidity and sticks less to a thermal head of a low-torque printer in an environment of low-temperature and low-humidity.

Specific examples of the surfactant include an aqueous solution of alkylsulfosuccinate, 2,4,7,9-tetramethyl-5-decine-4,7-diol, mineral oils, etc. Particularly, the aqueous solution of alkylsulfosuccinate can most effectively be used.

The protective layer preferably includes a release agent in an amount of from 0.05 to 1.0 parts by weight based on total weight of the binder resin.

Specific examples of the binder resin include the following: polyvinylalcohol; amylum and its derivatives; cellulose derivatives such as methoxy cellulose, hydroxy ethyl cellulose and carboxy methyl cellulose; and water-soluble polymers such as polysodium acrylate, polyvinyl pyrrolidone, styrene/maleic acid anhydride copolymer alkali salt, isobutylene/maleic acid anhydride copolymer alkali salt, polyacrylamide, gelatin and casein. Preferably, it is advantageous to use a heat resistant resin which is difficult to melt and soften with a heat to improve sticking resistance of the resultant thermal recording material. From that standpoint, polyvinylalcohol including a reactive carbonyl group is most preferably used.

The polyvinylalcohol including a reactive carbonyl group can be prepared by known methods such as a method of copolymerizing a vinyl monomer including a reactive carbonyl group and a fatty acid vinyl ester to prepare a polymer, and saponifying the polymer. The vinyl monomer including a reactive carbonyl group includes a group including ester and a group including an acetone group, and a vinyl monomer having a diacetone group is preferably used. Specifically, diacetone acrylamide and methadiacetone acrylamide are preferably used. The fatty acid vinyl ester includes vinyl formate, vinyl acetate, vinyl propionate, etc., and vinyl acetate is preferably used. The polyvinylalcohol including a reactive carbonyl group for use in the present disclosure may be copolymerized with a vinyl monomer copolymerizable. Specific examples of the vinyl monomer copolymerizable include acrylic ester, butadiene, ethylene, propylene, acrylic acid, methacrylic acid, maleic acid, maleic acid anhydride, itaconic acid, etc. The polyvinylalcohol including a reactive carbonyl group preferably includes the reactive carbonyl group in an amount of 0.5 to 20 mol %, and more preferably from 2 to 10 mol % in terms of the water resistance of the resultant thermal recording material. When less than 2 mol %, the water resistance is practically insufficient. Even when greater than 10 mol %, which is uneconomical, the water resistance does not improve.

The polyvinylalcohol including a reactive carbonyl group for use in the present disclosure preferably has a polymerization degree of from 300 to 3,000, and more preferably from 500 to 2,200. In addition, the polyvinylalcohol including a reactive carbonyl group preferably has a saponification degree not less than 80%.

The crosslinker is advantageously included in the protective layer so as to make the binder resin more heat resistant and difficult to melt and soften for improving the sticking resistance of the resultant thermal recording material. The crosslinker is preferably a hydrazide compound.

The hydrazide crosslinker may be any crosslinkers having a hydrazide group. Specific examples thereof include, but are not limited to, carbohydrazide, hydrazide oxalate, hydrazide formate, hydrazide acetate, dihydrazide malonate, dihydrazide succinate, dihydrazide adipate, hydrazide azelate, dihydrazide sebacate, dihydrazide tridodecanoate, dihydrazide maleate, dihydrazide fumarate, dihydrazide itaconate, hydrazide benzoate, dihydrazide glutarate, hydrazide diglycolate, dihydrazide tartrate, dihydrazide malate, hydrazide isophthalate, dihydrazide terephthalate, 2,7-dihydrazide naphthoate, dihydrazide polyacrylate, etc. These can be used alone or in combination, and may be combined with other known crosslinkers provided the combinations do not impair the function as a crosslinker. Among these hydrazide compounds, dihydrazide adipate is preferably used in terms of water resistance and security.

The protective layer preferably includes the crosslinker in an amount of from 0.05 to 0.30 parts by weight per 1 part of the binder resin.

Specific examples of the filler include, but are not limited to, the following: fine powders of inorganic materials such as aluminum hydroxide, kaolin, calcium carbonate, silica, zinc oxide, titanium oxide, zinc hydroxide, barium sulfate, clay, talc, surface-treated calcium and silica; and fine powders of organic materials such as a urea formalin resin, a styrene/methacrylic acid copolymer and a polystyrene resin.

Particularly, aluminum hydroxide, kaolin and calcium carbonate abrade the thermal head less. Aluminium hydroxide having an average particle diameter of from 0.2 to 0.5 μm, abrades the thermal head much less, and has good high-temperature transportability, low-temperature sticking resistance and low-torque printer suitability. When less than 0.2 μm, the thermal head is further less abraded, but the high-temperature transportability, low-temperature sticking resistance and low-torque printer suitability thereof deteriorate.

The protective layer preferably includes the filler in an amount of from 0.1 to 2.5 parts by weight per 1 part of the binder resin.

Further, the protective layer of the present disclosure may optionally include supplements such as a surfactant, a lubricant and a pressure coloring inhibitor conventionally used in the thermal recording material.

Particularly, fatty acids such as a montan ester wax, a stearic acid and behenic acid, fatty acid amides such as an amide stearate and an amide palmitate, zinc stearate, aluminum stearate, calcium stearate, etc., decrease the resistivity of the protective layer, and they are preferably included therein to improve the transportability and sticking resistance.

Specific examples of fillers which can be included in the thermal coloring layer of the present disclosure include known inorganic and organic pigments such as calcium carbonate, zinc oxide, aluminum oxide, titanium oxide, silica, aluminum hydroxide, barium sulfate, talc, kaolin, alumina and clay. In terms of water resistance, the acidic pigments such as silica, kaolin and alumina are preferably used. In terms of coloring density, silica is preferably used. The acidic filler included in the thermal coloring layer can increase the water resistance of the resultant thermal recording material and shorten the time until the thermal recording material is water resistant when the protective layer is formed thereon. This is considered to be because the acidic filler included in the thermal coloring layer accelerates the water resistant reaction when the protective layer coating liquid is coated thereon.

Specific examples of a binder resin for use in the thermal coloring layer include those used in the protective layer. The polyvinylalcohol including a reactive carbonyl group included therein can make the resultant thermal recording material water resistant without adding a crosslinker impairing colorization therein. This is considered to be because the crosslinker in the protective layer impregnates and contacts the thermal coloring layer.

When the thermal coloring layer includes an oligomer composition and a hindered amine derivative formed from a reaction between a multivalent isocyanate compound having three or more valences and the following formula (I) and an aromatic amine having the following formula (II), the chemical resistance, particularly the plasticizer resistance, of the resultant thermal recording material is noticeably improved, resulting in increase of image residual ratio:

$$X(NCO)_a \quad (I)$$

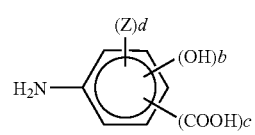

wherein X represents a group having three or more valences, a represents an integer not less than 3, b and c independently represent an integer of from 0 to 4, and b+c is an integer of from 1 to 4, Z represents a hydrogen atom, an alkyl group, an allyl group or an aryl group, and the aryl group may form a condensed ring, and d represents an integer of from 1 to 4, and b+c+d is an integer of from 2 to 5.

Further, when the thermal coloring layer includes a diphenyl sulfonic acid derivative having the following formula (III), the chemical resistance thereof is further improved:

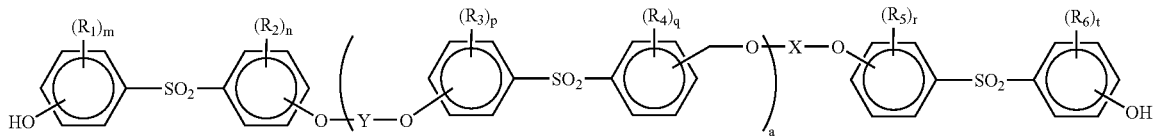

(III)

wherein X and Y independently represent carbon radical which may have a direct chain or a branched chain, and may have a saturated or an unsaturated ether bond having 1 to 12 carbon atoms, or represent

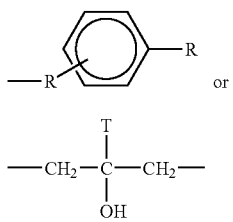

wherein R independently represents a methylene group or an ethylene group, and T represents a hydrogen atom and an alkyl group having 1 to 4 carbon atoms, $R_1$, to $R_6$ independently represent a halogen atom, an alkyl group having 1 to 6 carbon atoms, and an alkenyl group, m, n, p, q, r and t represent integers of from 0 to 4, and a represents an integer of from 0 to 10.

Specific examples of a diphenyl sulfonic acid derivative having the formula (III) include D-90 from NIPPON SODA CO., LTD.

Specific examples of the developer for use in the present disclosure include known developers used in the thermal recording material, and 2,4'-bishydroxydiphenylsulfone and 4-hydroxy-4'-allyloxydiphenylsulfone are most effectively used for the resultant thermal recording material to have chemical resistance, high sensitivity and heat resistance.

Specific examples of other developers include
4-hydroxy-4'-isoproxydiphenylsulfone,
4,4'-isopropylidenebisphenol,
4,4'-isopropylidenebis(o-methyl phenol), 4,4'-secondary butylidene bisphenol, 4,4'-isopropylidenebis(2-tertiaey butyl phenol), 4,4'-methylenebis(oxyethylenethio)diphenol, p-nitrobenzoate zinc,
1,3,5-tris(4-tertiarybutyl-3-hydroxy-2,
6-dimethylbenzyl)isocyanuric acid,
2,2-(3,4'-dihydroxydiphenyl)propane,
bis(4-hydroxy-3-methylphenyl)sulfide, 4-{β-(p-methoxy phenoxy)ethoxy}salicylic acid,
1,7-bis(4-hydroxyphenylthio)-3,5-dioxaheptane, 1,5-bis(4-hydroxyphenylthio)-5-oxapentane, phthalic acid mono benzyl ester mono calcium salt, 4,4'-cyclohexylidenediphenol,
4,4'-isopropylidenebis(2-chlorophenol),
2,2'-methylenebis(4-methyl-6-tertiarybutylphenol),
4,4'-butylidenebis(6-tertiarybutyl-2-methyl)phenol,
1,1,3-tris(2-methyl-4-hydroxy-5-tertiarybutylphenyl)butane, 1,1,3-tris(2-methyl-4-hydroxy-5-cyclohexylphenyl)butane,
4,4-thiobis(6-tertiarybutyl-2-methyl)phenol, 4,4'-diphenolsulfone,
4-isopropoxy-4'-hydroxydiphenylsulfone,
4-benzyloxy-4'-hydroxydiphenylsulfone,
4,4'-diphenolsulfoxide, p-hydroxyisopropylbenzoate, p-hydroxybenzylbenzoate, benzylprotocatechuate, stearyl gallate, lauryl gallate, octyl gallate,
1,3-bis(4-hydroxyphenylthio)propane, N,N-diphenylthiourea,
N,N'-di(m-chlorophenyl)thiourea, salicylanilide,
bis-(4-hydroxyphenyl)methyl acetate ester,
bis-(4-hydroxyphenyl)benzyl acetate ester,
1,3-bis(4-hydroxycumyl)benzene,
1,4-bis(4-hydroxycumyl)benzene,
2,2-diallyl-4,4'-diphenolsulfone,
3,4-dihydroxyphenyl-4'-methyldiphenylsulfone,
1-acetyloxy-2-zinc naphthoate, 2-acetyloxy-1-zinc naphthoate,
2-acetyloxy-3-zinc naphthoate,
α,α-bis(4-hydroxyphenyl)-α-methyltoluene, antipyrine complexes of zinc thiocyanate, tetrabromobisphenol A, tetrabromobisphenol S, 4,4'-thiobis(2-methylphenol),
4,4'-thiobis(2-chlorophenol), compounds having a sulfonyl amino carbonyl amide group, etc.

The leuco dye for use in the thermal coloring layer of the present disclosure can be used alone or in combination. Specific examples thereof include any known leuco dyes used in the thermal recording material, such as triphenyl methane leuco dyes, fluoran leuco dyes, phenothiazine leuco dyes, auramine leuco dyes, spyropyrane leuco dyes and indolinophthalide leuco dyes.

Specific examples of leuco dyes include
3,3-bis(p-dimethylaminophenyl)-phthalide,
3,3-bis(p-dimethylaminophenyl)-6-dimethyl-aminophthalide (known as crystal violet lactone),
3,3-bis(p-dimethylaminophenyl)-6-diethylaminophthalide,
3,3-bis(p-dimethylaminophenyl)-6-chlorphthalide,
3,3-bis(p-dibutylaminophenyl)phthalide,
3-cyclohexylamino-6-chlorfluoran,
3-dimethyl-amino-5,7-dimethyl-fluoran,
3-N-methyl-N-isobutyl-6-methyl-7-anilinofluoran,
3-N-ethyl-N-isoamile-6-methyl-7-anilinofluoran,
3-diethyl-amino-7-chlorofluoran,
3-diethyl-amino-7-methylfluoran,
3-diethyl-amino-7,8-benzfluoran,
3-diethyl-amino-6-methyl-7-chlorfluoran,
3-(N-p-tolyl-N-ethylamino-)-6-methyl-7-anilinofluoran,
3-pyrollidino-6-methyl-7-anilinofluoran, 2-{N-(3-trifluoromethyl-phenyl)amino}-1-6-diethylamino-fluoran, 2-{3,6-bis(diethylamino)-9-(o-chloranilino)xanthyl lactam benzoate},
3-diethylamino-6-methyl-7-(m-trichloromethyl-anilino)fluoran, 3-diethylamino-7-(o-chloranilino)fluoran,
3-N-methyl-N-amileamino-6-methyl-7-anilinofluoran,
3-N-methyl-N-cycloehxylamino-6-methyl-7-anilinofluoran,
3-diethylamino-6-methyl-7-anilinofluoran, 3-diethylamino-6-methyl-7-(2',4'-dimethylanilino)fluoran,
3-(N,N-diethylamino) -5-methyl-7-(N,N-dibenzylamino)fluoran, benzoyl leuco methylene blue,
6'-chloro-8'-methoxy-benzoindolino-spiropyran,
6'-bromo-3'-methoxy-benzoindolino-spiropyran,
3-(2'-hydroxy-4'-dimethylaminophenyl)-3-(2'-methoxy-5'-chlorphenyl)phthalide,
3-(2'-hydroxy-4'-dimethylaminophenyl)-3-(2'-methoxy-5'-nitrophenyl)phthalide,
3-(2'-hydroxy-4'-diethylaminophenyl)-3-(2'-methoxy-5'-methyl-phenyl)phthalide,
3-(2'-methoxy-4'-dimethyl-aminophenyl)-3-(2'-hydroxy-4'-chlor-5'-methyl-phenyl)phthalide,
3-morpholino-7-(N-propyl-trifluoromethylanilino)fluoran,
3-pyrollidino-7-trifluoromethyl-anilinofluoran,
3-diethylamino-5-chloro-7-(N-benzyltrifluoromethyl-anilino)fluoran,
3-pyrollidino-7-(di-p-chlorphenyl)methylaminofluoran,
3-diethylamino-5-chlor-7-(α-phenylethylamino)fluoran,
3-(N-ethyl-p-toluidino)-7-(α-phenylethylamino)fluoran,
3-diethylamino-7-(o-methoxycarbonylphenylamino)fluoran,
3-diethylamino-5-methyl-7-(α-phenylethylamino)fluoran,
3-diethylamino-7-pyperidinofluoran,
2-chloro-3-(N-methyltoluidino)-7-(p-n-butylanilino)fluoran, 3-(N-methyl-N-isopropylamino)-6-methyl-7-anilinoflupran,
3-dibutylamino-6-methyl-7-anilinofluoran,
3-diethylamino-6-ethyl-7-(3-methylanilino)fluoran,
3,6-bis(dimethylamino)fluorenespiro(9,3')-6'-dimethylaminophthalide,
3-(N-benzyl-N-cyclohexylamino)-5,6-benzo-7-α-naphtylamino-4'-bromofluoran, 3-diethylamino-6-chlor-7-anilinofluoran,
3-N-ethyl-N-(2-ethoxypropyl)amino-6-methyl-7-anilinofluoran,
3-N-ethyl-N-tetrahydrofurfurylamino-6-methyl-7-anilnofluoran, 3-diethylamino-6-methyl-7-mesidino-4',5'-benzofluoran,
3-(p-dimethylaminophenyl)-3-{1,1-bis(p-dimethylaminophenyl)ethylene-2-yl}phthalide,
3-(p-dimethylaminophenyl)-3-{1,1-bis(p-dimethylaminophenyl)ethylene-2-yl}-6-dimethylaminophthalide,
3-(p-dimethylaminophenyl)-3-(1-p-dimethylaminophenyl-1-phenylethylene-2-yl)phthalide,
3-(p-dimethylaminophenyl)-3-(1-p-dimethylaminophenyl-1-p-chlorophenylethylene-2-yl)-6-dimethylaminophthalide,
3-(4'-dimethylaminp-2'-methoxy)-3-(1"-p-dimethylaminophenyl-1"-p-chlorophenyl-1",3"-butadiene-4"-yl)benzophthalide,
3-(4'-dimethyl-aminp-2'-benzyloxy)-3-(1"-p-dimethylamino-phenyl-1"-phenyl-1",3"-butadiene-yl)benzophthalide,
3-dimethylamino-6-dimethylaminofluorene-9-spirp-3'(6'-dimethyl-amino)phthalide,
3,3-bis12-(p-dimethylaminophenyl)-2-(p-methoxyphenyl)etenyl1-4,5,6,7-tetrachlorophthalide,
3-bis{1,1-bis(4-pyrollidinophenyl)ethylene-2-yl}-5,6-dichloro-4,7-dibromophthalide,
bis(p-dimethylaminostyryl)-1-naphthalenesulfonylmethane,
bis(p-dimethylaminostyryl)4-p-tolylsulfonylmethane, etc.
Particularly, 3-dibutylamino-6-methyl-7-anilinofluoran,
3-di(n-pentyl)amino-6-methyl-7-anilinofluoran or
3-(N-ethyl-N-p-toluidino)-6-methyl-7-anilinofluoran is preferably used for the resultant thermal recoding material to have good plasticizer resistance, and high sensitivity and thermostability without background development.

The thermal coloring layer of the present disclosure can optionally include an electron accepting hindered phenol compound and an electron accepting hindered amine compound having less colorability as a supplemental additive. Specific examples thereof include
2,2'-methylenebis(4-ethyl-6-tertiarybutylphenol),
4,4'-butylidenebis(6-tertiarybutyl-2-methylphenol),
1,1,3-tris(2-methyl-4-hydroxy-5-tertiarybutylphenyl)butane,
1,1,3-tris(2-methyl-4-hydroxy-5-cyclohexylphenyl)butane,
4,4'-thiobis(6-tertiarybutyl-2-methylphenol), tetrabromobisphenol A, tetrabromobisphenol S,
4,4'-thiobis(2-methylphenol), 4,4'-thiobis(2-chlorophenol),
tetrakis(1,2,2,6,6-pentamethyl-4-piperidyl)-1,2,3,4-butane-tetracarboxylate,
tetrakis(1,2,2,6,6-tetramethyl-4-piperidyl)-1,2,3,4-butane-tetracarboxylate, etc.

The substrate for use in the present disclosure includes a bond paper, a substrate including a recycle pulp in an amount not less than 50%, a synthetic paper, a polyethylene film, a laminated paper, etc.

In addition, an intermediate layer may be formed between the substrate and the thermal coloring layer. The intermediate layer can include the binder resin and the filler used in the thermal coloring layer. A hollow particulate resin is preferably used in the intermediate layer as a filler because of being capable of improving the sensitivity of the resultant thermal recording layer with the adiathermancy. The hollow particulate resin for use in the present disclosure is a thermoplastic resin including air or other gas, a foamed microscopic hollow particulate material, and preferably has an average particle diameter of from 0.4 to 10 μm, and more preferably from 1.0 to 5.0 μm. When less than 0.4 μm, it is difficult for the hollow particulate resin to have a desired hollow rate. When greater than 10 μm, the surface smoothness decreases, resulting in deterioration of the sensitivity. Therefore, in addition to the above-mentioned range of the average particle diameter, the hollow particulate resin preferably has a sharp particle diameter distribution. Further, the microscopic hollow particulate material for use in the present disclosure preferably has a hollow rate not less than 30%, and more preferably not less than 70%. The hollow rate is a ratio of an inner diameter of the hollow particulate material to an outer diameter thereof as follows:

Hollow rate=inner diameter of the hollow particulate material/outer diameter thereof×100

Specific examples of the thermoplastic resin include polystyrene, polyvinylchloride, polyvinylidenechloride, polyvinylacetate, polyetseracrylate, polyacrylonitrile, polybutadiene, their copolymer resins, etc. Particularly, a copolymer resin mainly including polyvinylidenechloride and polyacrylonitrile is preferably used.

The hollow particulate material included in the intermediate layer between the thermal coloring layer and the substrate improves the coloring sensitivity of the resultant thermal recording material with the adiathermancy.

Specific examples of recording means of the thermal recording material of the present disclosure include, but are not limited to, heat pens, thermal heads and lasers.

The thermal recording material of the present disclosure can be a thermal recording label having an adhesive layer on the backside, and a linerless thermal recording label having a thermal adhesive layer. Known adhesives can be used for the adhesive layer. In addition, images can be printed on the surface of the protective layer of the thermal recording material of the present disclosure with an UV cure ink.

Having generally described embodiments of a thermal recording material according to this disclosure, further understanding can be obtained by reference to certain specific examples which are provided herein for the purpose of illustration only and are not intended to be limiting. In the descriptions in the following examples, the numbers represent weight ratios in parts and percent, unless otherwise specified.

EXAMPLES

Examples 1 to 17 and Comparative Examples 1 and 2

(1) Preparation of Dye Dispersion A for Thermal Coloring Layer

The following constituents were dispersed by a sand mill to have an average particle diameter of 0.5 μm.

| | |
|---|---|
| 3-dibutylamino-6-methyl-N-7-anilinofluoran | 20 |
| Aqueous solution including polyvinylalcohol in an amount of 10% | 20 |
| Water | 60 |

(2) Preparation of Developer Dispersion B for Thermal Coloring Layer

The following constituents were dispersed by a ball mill.

| | |
|---|---|
| Developer | Table 1 |
| Inorganic filler | Table 1 |
| Aqueous solution including polyvinylalcohol in an amount of 10% | 20 |
| Water | 40 |

(3) Preparation of Filler Dispersion C for Protective Layer

The following constituents were dispersed by a ball mill such that the filler has an average particle diameter mentioned in Table 1.

| | |
|---|---|
| Filler (Table 1) | 100 |
| Aqueous solution including polyvinylalcohol in an amount of 10% | 20 |
| Water | 40 |

(4) Preparation of Thermal Coloring Layer Coating Liquid

The following constituents were mixed to prepare a thermal coloring layer coating liquid.

| | |
|---|---|
| Dispersion A | 20 |
| Dispersion B | 60 |
| Filler (Table 1) | 10 |
| Aqueous solution of resin (Table 1) | 30 | including a solid content in an amount of 10% Aqueous solution of dioctylsulfosuccinic acid 1 including a solid content in an amount of 5%

(5) Preparation of Protective Layer Coating Liquid

The following constituents were mixed to prepare a protective layer coating liquid.

| | |
|---|---|
| Dispersion C | 60 |
| Release agent | Table 1 |
| Aqueous solution of resin (Table 1) including a solid content in an amount of 10% | 100 |
| Aqueous solution of crosslinker (Table 1) including a solid content in an amount of 10% | 10 |
| Aqueous solution of dioctylsulfosuccinic acid including a solid content in an amount of 5% | 1 |
| Additive (Table 1) | 20 |

(6) Preparation of Intermediate Layer Coating Liquid

The following constituents were mixed and dispersed to prepare an intermediate layer coating liquid (6)-1.

| | |
|---|---|
| Calcined kaolin | 20 |
| Styrene/butadiene copolymer latex including a solid content in an amount of 47.5% | 20 |
| Water | 60 |

The following constituents were mixed and dispersed to prepare an intermediate layer coating liquid (6)-2.

| | |
|---|---|
| Hollow particulate resin having a hollow rate of 90%, an average particle diameter of 3.5 μm and a solid content in an amount of 40% | 25 |
| Styrene/butadiene copolymer latex including a solid content in an amount of 47.5% | 15 |
| Water | 60 |

Preparation of Thermal Recording Material

The intermediate layer coating liquid mentioned in Table 1 was coated on a paper having a weight of 60 g/M$^2$ to form an intermediate layer thereon, having a coated amount of 3.0 g/M$_2$ when dried. The thermal coloring layer coating liquid was coated on the intermediate layer to form a thermal coloring layer thereon, having a coated amount of 0.54 g/m$^2$ when dried. Further, the protective layer coating liquid was coated on the thermal coloring layer to form a protective layer thereon, having a coated amount of 1.5 g/m$^2$ when dried. Then, the three-layer coated material was calendered to prepare each thermal recording material in Examples 1 to 17 and Comparative Examples 1 and 2 shown in Table 1.

The average particle diameter was measured by the laser diffraction particle diameter distribution measurer LA-920 from Horiba, Ltd.

TABLE 1

| | Intermediate Layer | Thermal coloring layer | | | Release agent | Protective layer | | | | |
|---|---|---|---|---|---|---|---|---|---|---|
| | | Developer | Resin | Filler | | Filler | Particle Diameter of filler | Resin | Cross-linker | Additive |
| Com. Ex. 1 | (6)-1 | I-1 | V-1 | Nil | III-1 | IV-1 | 1.0 μm | V-1 | VI-1 | Nil |
| Com. Ex. 2 | (6)-1 | I-1 | V-1 | Nil | III-2 | IV-1 | 1.0 μm | V-1 | VI-1 | Nil |
| Ex. 1 | (6)-1 | I-1 | V-1 | Nil | III-3 | IV-1 | 1.0 μm | V-1 | VI-1 | Nil |
| Ex. 2 | (6)-1 | I-1 | V-1 | Nil | III-4 | IV-1 | 1.0 μm | V-1 | VI-1 | Nil |
| Ex. 3 | (6)-1 | I-1 | V-1 | Nil | III-5 | IV-1 | 1.0 μm | V-1 | VI-1 | Nil |
| Ex. 4 | (6)-1 | I-1 | V-1 | Nii | III-5 | IV-1 | 1.0 μm | V-2 | VI-2 | Nil |
| Ex. 5 | (6)-1 | I-1 | V-1 | Nil | III-5 | IV-1 | 1.0 μm | V-2 | VI-3 | Nil |
| Ex. 6 | (6)-1 | I-1 | V-1 | Nil | III-5 | IV-2 | 1.0 μm | V-2 | VI-3 | Nil |
| Ex. 7 | (6)-1 | I-1 | V-1 | Nil | III-5 | IV-3 | 1.0 μm | V-2 | VI-3 | Nil |
| Ex. 8 | (6)-1 | I-1 | V-1 | Nil | III-5 | IV-4 | 1.0 μm | V-2 | VI-3 | Nil |
| Ex. 9 | (6)-1 | I-1 | V-1 | Nil | III-5 | IV-4 | 1.0 μm | V-2 | VI-3 | VII-1 |
| Ex. 10 | (6)-1 | I-1 | V-1 | Nil | III-5 | IV-4 | 0.4 μm | V-2 | VI-3 | VII-1 |
| Ex. 11 | (6)-1 | I-1 | V-1 | II-1 | III-5 | IV-4 | 0.4 μm | V-2 | VI-3 | VII-1 |
| Ex. 12 | (6)-1 | I-1 | V-1 | II-2 | III-5 | IV-4 | 0.4 μm | V-2 | VI-3 | VII-1 |
| Ex. 13 | (6)-1 | I-1 | V-2 | II-2 | III-5 | IV-4 | 0.4 μm | V-2 | VI-3 | VII-1 |
| Ex. 14 | (6)-1 | I-2 | V-2 | II-2 | III-5 | IV-4 | 0.4 μm | V-2 | VI-3 | VII-1 |
| Ex. 15 | (6)-1 | I-3 | V-2 | II-2 | III-5 | IV-4 | 0.4 μm | V-2 | VI-3 | VII-1 |
| Ex. 16 | (6)-1 | I-4 | V-2 | II-2 | III-5 | IV-4 | 0.4 μm | V-2 | VI-3 | VII-1 |
| Ex. 17 | (6)-2 | I-1 | V-2 | II-2 | III-5 | IV-4 | 0.4 μm | V-2 | VI-3 | VII-1 |

<Developer>
  I-1: 4-hydroxy-4'-isoproxydiphenaylsulfone 30
  I-2: 4-hydroxy-4'-isoproxydiphenaylsulfone/an oligomer composition and a hindered amine derivative formed from a reaction between a multivalent isocyanate compound having three or more valences and the formula (I) and an aromatic amine having the formula (II) 30/3
  I-3: 4-hydroxy-4'-isoproxydiphenaylsulfone/an oligomer composition and a hindered amine derivative formed from a reaction between a multivalent isocyanate compound having three or more valences and the formula (I) and an aromatic amine having the (II)/a diphenyl sulfonic acid derivative having the formula (III) 30/3/35
  I-4: 2,4'-bishydroxysulfone/an oligomer composition and a hindered amine derivative formed from a reaction between a multivalent isocyanate compound having three or more valences and the formula (I) and an aromatic amine having the (II)/a diphenyl sulfonic acid derivative having the formula (III) 30/3/35

<Filler in Thermal Coloring Layer>
  II-1: Calcined kaolin
  II-2: Silica

<Release Agent in Protective Layer>
  III-1: Silica

| 111-2: | Silicone oil emulsion including a solid content of 30% (SH7036 from Dow Corning Toray Silicone Co., Ltd.) | 30 |
| 111-3: | Particulate silicone resin having an average particle diameter of 5.0 μm (X-52-1621 from Shin-Etsu Chemical Co., Ltd.) | 9 |
| 111-4: | Particulate silicone resin having an average particle diameter of 2.0 μm (KMP-590 from Shin-Etsu Chemical Co., Ltd.) | 9 |
| 111-5: | KMP-590 alkylsulfosuccinic acid salt solution including a solid content of 30% | |

<Filler in Protective Layer>
  IV-1: Silica
  IV-2: Calcium carbonate
  IV-3: Calcined kaolin
  IV-4: Aluminum hydroxide <Resin for Thermal Recording Layer and Protective Layer>
  V-1: Polyvinylalcohol
  V-2: polyvinylalcohol solution having a diacetone amide group (including a solid content of 10%, diacetone acrylic amide of 4 mol %, and having a polymerization degree of 1,600 and a saponification of 98%)

<Crosslinker in Protective Layer>
  VI-1: Sponge
  VI-2: Epichlorohydrin
  VI-3: Hydrazide adipate <Additive in Protective Layer>
  VII-1: Ester montanate emulsion (from CHUKYO YUSHI CO., LTD.)

Evaluation Methods for Thermal Recording Material (1) Transportability Under an Environment of High-Humidity After each thermal recording material and a printer SM-90 from TERAOKA SEIKO CO., LTD. were left under an environment of high-temperature and humidity at 40° C. and 90% RH for 1 hr, the thermal recording material was printed by the SM-90. The length of a printed image is a length thereof from the start to the end of printing the image when a specific image pattern is printed by the printer. When the thermal recording material has good sticking resistance, the image pattern is precisely printed thereon. When the sticking resistance is poor, the image is doubly printed or the thermal recording material snakes, resulting in shorter length thereof than the image precisely printed.

The transportability was visually observed to classify the transportability to 8 grades.

8: Transportable without sticking

.
.
.

1: Untransportable with sticking (2) Transportability Under an Environment of Low-temperature After each thermal recording material and a printer L'esprit R-12 from SATO CORPORATION were left under an environment of high-temperature and humidity at −5° C. and 20% RH for 1 hr, the thermal recording material was printed by the L'esprit R-12.

The transportability was visually observed to classify the transportability to 8 grades.

8: No sticking

.
.
.

1: Sticking considerably occurs (3) Transportability in Low-torque Printer Under an Environment of Low-temperature and Humidity After each thermal recording material and a printer FHT205B from Fujitsu Limited were left under an environment of high-temperature and humidity at −5° C. and 20% RH for 1 hr, the thermal recording material was printed by the FHT205B.

The transportability was visually observed to classify the transportability to 8 grades.

8: No sticking

.
.
.

1: Sticking considerably occurs (4) Abrasion Resistance

After each thermal recording material was printed by a high-speed printer I-4308 from DATAMAX CO., LTD. at a printing speed of 8 ips for 100 Km at 22° C. and 60% RH, the abraded amount of the thermal head was measured by using a laser microscope VK-8500 and VK-8510 from KEYENCE CORPORATION.

(5) Plasticizer Resistance

A test sample from each thermal recording material printed by an image simulator from Ohkura Electric Co., Ltd. was overlapped with 3 pieces of vinylchloride wrappers, and further overlapped with 10 pieces of bond papers. After a weight was placed on the overlapped sample so as to have a load about 200 g/cm$^2$ at 40° C. for 24 hrs, the image density was measured by Macbeth densitometer RD-914.

(6) Heat Resistance

The background density of each thermal recording material left at 80° C. and 90° C. for 24 hrs was measured by Macbeth densitometer RD-914.

(7) Sensitivity Magnification

Each thermal recording material calendered was printed by a thermal printing tester having a thin-film head from Matsushita Electronic Components co., Ltd. under conditions of head electric power at 0.45 W/dot, recording time at 20 m sec/line, scanning density at 8×385 dot/mm and at a pulse width 0.0 to 0.7 m sec per 1 m sec. The image density was measured by Macbeth densitometer RD-914. The sensitivity magnification of the thermal recording material in Comparative Example 1 was a standard (1.00), and the sensitivity magnifications of the other thermal recording materials were determined as follows:

The pulse width of the thermal recording material in Comparative Example 1/the pulse width of each of the other thermal recording materials. The larger, the more sensitive (heat responsive).

The evaluation results are shown in Table 2.

TABLE 2

| | | | | (4) | | (6) | | |
| | (1) | (2) | (3) | (μm) | (5) | 80° C. | 90° C. | (7) |
| --- | --- | --- | --- | --- | --- | --- | --- | --- |
| Com. Ex. 1 | 2 | 2 | 2 | 12.0 | 0.52 | 0.10 | 0.35 | 1.00 |
| Com. Ex. 2 | 1 | 1 | 1 | 6.0 | 0.52 | 0.10 | 0.35 | 1.00 |
| Ex. 1 | 2 | 2 | 2 | 8.0 | 0.52 | 0.10 | 0.35 | 1.01 |
| Ex. 2 | 2 | 2 | 3 | 6.0 | 0.52 | 0.10 | 0.35 | 1.01 |
| Ex. 3 | 3 | 3 | 3 | 6.0 | 0.52 | 0.10 | 0.35 | 1.01 |
| Ex. 4 | 4 | 4 | 3 | 6.0 | 0.52 | 0.10 | 0.35 | 1.02 |
| Ex. 5 | 5 | 5 | 4 | 6.0 | 0.52 | 0.10 | 0.35 | 1.02 |
| Ex. 6 | 5 | 5 | 4 | 4.5 | 0.52 | 0.10 | 0.35 | 1.03 |
| Ex. 7 | 5 | 5 | 5 | 3.5 | 0.52 | 0.10 | 0.37 | 1.02 |
| Ex. 8 | 5 | 5 | 5 | 3.0 | 0.52 | 0.10 | 0.38 | 1.02 |
| Ex. 9 | 6 | 6 | 5 | 3.0 | 0.52 | 0.10 | 0.38 | 1.02 |
| Ex. 10 | 6 | 6 | 5 | 0.7 | 0.52 | 0.10 | 0.38 | 1.02 |
| Ex. 11 | 6 | 6 | 5 | 0.7 | 0.52 | 0.10 | 0.38 | 1.02 |
| Ex. 12 | 7 | 7 | 6 | 0.7 | 0.52 | 0.10 | 0.38 | 1.02 |
| Ex. 13 | 8 | 8 | 8 | 0.7 | 0.52 | 0.10 | 0.38 | 1.02 |
| Ex. 14 | 8 | 8 | 8 | 0.7 | 0.89 | 0.10 | 0.38 | 1.02 |
| Ex. 15 | 8 | 8 | 8 | 0.7 | 1.25 | 0.10 | 0.38 | 1.02 |
| Ex. 16 | 8 | 8 | 8 | 0.7 | 1.26 | 0.09 | 0.10 | 1.09 |
| Ex. 17 | 8 | 8 | 8 | 0.7 | 1.26 | 0.09 | 0.10 | 1.18 |

Example 18

An adhesive layer was formed on the backside of the thermal recording material prepared in Example 17 to prepare a thermal recording label.

Example 19

A thermal adhesive layer was formed on the backside of the thermal recording material prepared in Example 17 to prepare a thermally-adhesive thermal recording label.

Example 20

The protective layer of the thermal recording label prepared in Example 18 was printed with an UV cure ink RNC ink from T&K TOKA CO., LTD. to prepare a pre-printed thermal recording label.

The thermal recording label, thermally-adhesive thermal recording label and pre-printed thermal recording label prepared in Examples 18 to 20 respectively had the same properties as those of the thermal recording material prepare in Example 17.

Additional modifications and variations of the embodiments and examples discussed above are possible in light of the above teachings. It is therefore to be understood that within the scope of the appended claims the invention may be practiced other than as specifically described herein.

This document claims priority and contains subject matter related to Japanese Patent Application No. 2004-272964 filed on Sep. 21, 2004, the entire contents of which are herein incorporated by reference.

What is claimed is:

1. A thermal recording material, comprising:
a substrate;
a thermal coloring layer located overlying the substrate; and a protective layer located overlying the thermal coloring layer, comprising:
a binder resin;
a crosslinker;
a filler; and
a release agent,
wherein the release agent is a spherical and particulate silicone compound having the following formula:

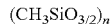

wherein n represents an integer greater than 15.

2. The thermal recording material of claim 1, wherein the spherical and particulate silicone compound has an average particle diameter in a range from 1 to 4 μm.

3. The thermal recording material of claim 1, wherein the protective layer is protective layer coating liquid comprising the binder resin, crosslinker, filler and spherical and particulate silicone compound applied to coat the thermal coloring layer, and wherein the protective layer coating liquid is prepared by uniformly dispersing the spherical and particulate silicone compound in a surfactant solution to prepare a release agent liquid, and adding the release agent liquid in the protective layer coating liquid.

4. The thermal recording material of claim 1, wherein the binder resin is polyvinylalcohol including a reactive carbonyl group.

5. The thermal recording material of claim 1, wherein the crosslinker is a hydrazide compound.

6. The thermal recording material of claim 1, wherein the filler is a member selected from the group consisting of aluminum hydroxide, calcium carbonate and kaolin.

7. The thermal recording material of claim 6, wherein the aluminum hydroxide has an average particle diameter in a range from 0.2 to 0.5 μm.

8. The thermal recording material of claim 1, further comprising a montan ester wax.

9. The thermal recording material of claim 1, wherein the thermal coloring layer comprises an acidic filler.

10. The thermal recording material of claim 9, wherein the acidic filler is silica.

11. The thermal recording material of claim 1, wherein the thermal coloring layer further comprises polyvinylalcohol including a reactive carbonyl group.

12. The thermal recording material of claim 1, wherein the thermal coloring layer further comprises an oligomer composition and a hindered amine derivative formed from a reaction between a multivalent isocyanate compound having three or more valences and the following formula (I) and an aromatic amine having the following formula (II), the chemical resistance, particularly the plasticizer resistance, of the resultant thermal recording material is noticeably improved, resulting in increase of image residual ratio:

 (I)

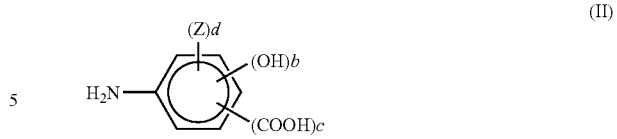

wherein X represents a group having three or more valences; a represents an integer not less than 3; b and c independently represent an integer in a range from 0 to 4, and b+c is an integer in a range from 1 to 4; Z represents a hydrogen atom, an alkyl group, an allyl group or an aryl group, and the aryl group may form a condensed ring; and d represents an integer in a range from 1 to 4, and b+c+d is an integer in a range from 2 to 5.

13. The thermal recording material of claim 1, wherein the thermal coloring layer further comprises a diphenyl sulfonic acid derivative having the following formula (III), the chemical resistance thereof being further improved:

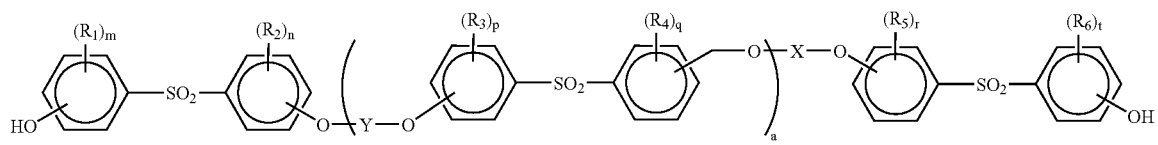

wherein X and Y independently represent carbon radical which may have a direct chain or a branched chain, and may have a saturated or an unsaturated ether bond having 1 to 12 carbon atoms, or represent

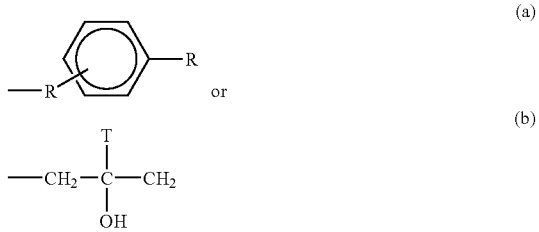

wherein R independently represents a methylene group or an ethylene group, and T represents a hydrogen atom and an alkyl group having 1 to 4 carbon atoms; $R_1$ to $R_6$ independently represent a halogen atom, an alkyl group having 1 to 6 carbon atoms, and an alkenyl group; m, n, p, q, r and t represent integers in a range from 0 to 4; and a represents an integer in a range from 0 to 10.

14. The thermal recording material of claim 1, wherein the thermal coloring layer further comprises 4-hydroxy-4'-allyloxydiphenylsulfone or 2,4'-bishydroxydiphenylsulfone as a developer.

15. The thermal recording material of claim 1, further comprising an intermediate layer comprising a thermoplastic hollow particulate resin between the substrate and the thermal coloring layer.

16. The thermal recording material of claim 1, further comprising an adhesive layer on the backside of the thermal recording material.

17. The thermal recording material of claim 16, wherein the adhesive layer is a thermal adhesive layer.

18. The thermal recording material of claim 1, wherein the surface of the protective layer is printed with an UV cure ink.

* * * * *